UNITED STATES PATENT OFFICE.

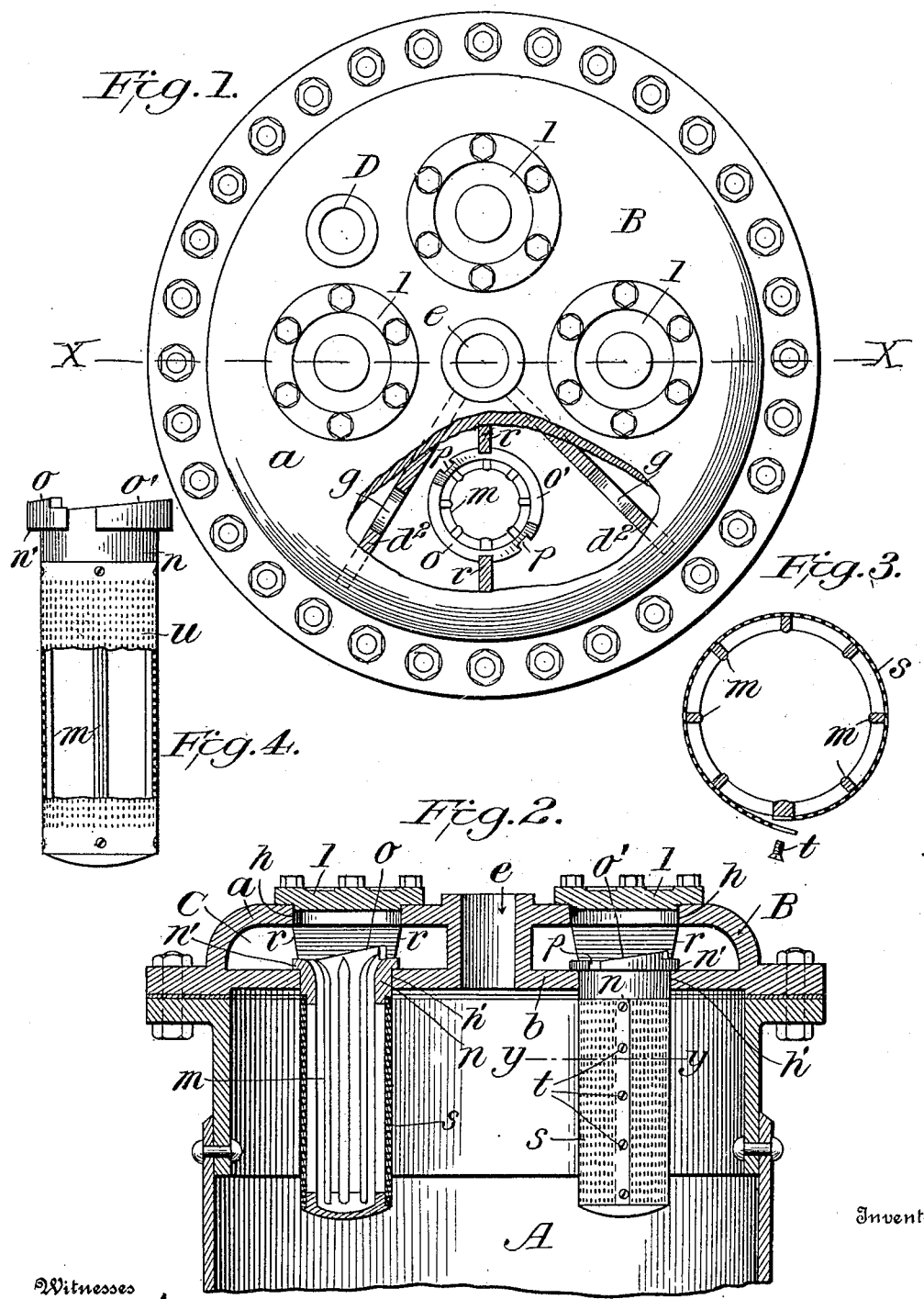

JAMES WILLARD MORRISON, OF BATAVIA, NEW YORK.

FILTER.

No. 927,743.     Specification of Letters Patent.     Patented July 13, 1909.

Application filed October 30, 1908. Serial No. 460,272.

*To all whom it may concern:*

Be it known that I, JAMES W. MORRISON, a citizen of the United States, residing at Batavia, in the county of Genesee and State of New York, have invented certain new and useful Improvements in Filters, of which the following is a specification.

My invention relates to means for purifying fluid by filtering or eliminating therefrom matters held in suspension and whose presence in the fluid is objectionable.

More particularly this invention has reference to mechanical means for filtering the feed water for boilers and the removal of salts which have been precipitated by reason of the feed water having been subjected to high temperature.

An essential object of the present invention is to construct a mechanical strainer which shall be readily accessible at all times, and one which shall be capable of renewal at small expense.

With the above and other objects in view my invention consists of the parts and the constructions, arrangements and combinations of parts which I will hereinafter describe and claim.

In the accompanying drawings forming part of this specification and in which similar reference characters indicate like parts in the several views:—Figure 1 represents a plan view partially broken away of the head end of a filter cylinder or casing in which my improved strainer is suspended. Fig. 2 is a vertical sectional view, of the upper end of the cylinder or casing on the line X—X of Fig. 1. Fig. 3 is an enlarged cross-sectional view of one of the strainers on the line Y—Y of Fig. 2, showing the strainer material disconnected at the meeting edges. Fig. 4 is a modification to be referred to.

It is a fact well known in this art that the salts in water, held in solution and suspension, become insoluble at certain temperatures. For instance, carbonate of lime becomes insoluble in water when heated to a temperature of about 220 degrees or over; sulfate of lime, when heated in water to about 310 degrees or over; and so on with many of the salts found in water and forming incrustation in steam boilers, when fed thereto, or where suspended water is held in solution. These same minerals, when heated, readily separate under certain temperatures, and can then be filtered out of the water; but I have found, after many series of experiments, that many filters heretofore designed for the foregoing purpose, will not withstand the severe strain due to high temperatures and pressures, to which they are subjected, consequently my aim has been to construct a strainer which shall be readily accessible and to provide improved means for detachably securing it in place within the head of the filter-casing into which feed-water is delivered, from some appropriate heater, not shown, before being supplied to the boiler. The strainer which I will now describe has been found to meet the requirements above mentioned.

The filter-casing A may, in practice be filled for a portion of its height with some material adapted to form a granular filter bed through which filtration occurs in a manner well known in this art, but which bed is not shown in the drawings, and said casing which may represent any vessel adapted to contain boiler feed-water, or other fluid, is provided with a suitable head B, having double-walls $a$, $b$, separated sufficiently to form an intermediate chamber C, said walls being connected by suitable radial or other partitions or webs $d^2$ so as to give increased strength to the head. Through both walls of the head at the center or at some other convenient point is an opening $e$ which forms an inlet through which the water or other fluid may enter directly into the filter casing or cylinder without entering the aforesaid chamber in the head or passing through the strainer. This is important as I have found by experience with filters constructed for purifying water at high temperatures under pressure where carbonates and sulfate of lime are present in solution and pass through a screen or foraminous vessel—that the precipitates invariably adhere to the strainer, to the extent of wholly or partially closing the same thus destroying or impairing its function to strain or filter out of the water the objectionable matter; also, when the filter is reversed to change the course of the fluid through the filter-bed and remove the accumulated deposit or sediment, the action of the filter is so retarded that the proper flushing thereof is nearly, if not quite impossible. In the present invention, however, I provide the aforesaid partitions or webs with openings $g$ whereby the strainer is brought into use only when the filter is being flushed by a reverse action, when the liquid passes through the strainer in an inward direction and then flows into the chamber C, in the head of the filter casing through the openings $g$, in the webs and finally passes out of the head through a suitable opening D.

The double walls of the head B, are formed with openings, $h$, $h'$, which are axially in line, the opening in the inner wall being designed to admit the strainer, which I will presently describe, and the opening in the outer wall being provided with a removable cover plate, $l$ for affording an easy and quick inspection of the strainer, or for renewal of said strainer.

The strainers herein shown are each composed of two parts, primarily, one being the cage and being constructed of parallel metal bars $m$ separated to form spaces at regular intervals, said bars being connected at their upper ends by a ring $n$, to form a strong frame-work adapted to support the strainer and the pressure to which it is subjected. The ring $n$, forms the top of the cage and it has an annular circumscribing flange, $n'$, which is designed to engage a seat on the lower or inner wall, $b$, of the head and surrounding the opening in which the strainer is suspended. The top of the cage is also formed with inclined cam-surfaces $o$, $o'$, and the periphery of the flange of said top is provided with slots or recesses $p$, said cam surfaces and recesses coacting with suitable lugs, $r$ in the filter head whereby when the cage is put in place, the said lugs pass through the aforesaid slots or recesses; then by turning the cage the cam-surfaces, $o$ and $o'$, ride under the lugs and cause the cage to be tightly seated upon the inner wall of the hollow head by a wedging action, to strongly secure the cage in place. The cage may be unlocked and readily removed, when desired, by turning it in an opposite direction and until the lugs register with the slots in the flange of the cage, and then lifting the cage out through the opening $h$, in the outer wall of the head. Surrounding the cage is a foraminous sheet of metal $s$, or other strainer material suitable for the purpose and which is secured to the cage in some appropriate manner. In Fig. 2, I show this material with its edges brought together and overlapping and the edges secured to each other and to one of the bars of the cage, by means of screws $t$. By these or equivalent means the sheet of strainer material is readily removable for cleaning, or renewal, as the condition may require.

It is, of course, not necessary that the strainer material should be constructed as above for other arrangements can be used without altering the character or scope of this part of my invention. For instance, a seamless tube, $u$, with perforations may be slipped over a cage and secured by one or more screws or other fastenings, as shown in Fig. 4. It is equally apparent that I may use any desired number of strainers in a single filter-head.

In the present case, I show, Fig. 1, four strainers as above described but this number may be increased or decreased without departing from the spirit of my invention.

Having thus described my invention what I claim as new and desire to secure by Letters Patent is:—

1. The combination with a filter casing having a chambered head with an inlet opening therethrough into the casing, of a strainer supported by the filter-head and projecting into the casing, means by which the strainer is held in locked position to the head, said head having an opening in its outer wall in line with the strainer, and a removable cap-plate for the opening affording access to the strainer and allowing said strainer to be removed endwise through the outer wall of the head.

2. The combination with a filter casing having a head provided with double-walls and an intermediate chamber, said head having an inlet opening leading directly into the casing, of a strainer carried by the head and projecting into the casing said strainer including a cage formed of spaced bars and an exterior covering of filtering material, and said cage having an annular ring at the top provided with an outstanding flange adapted to seat upon the inner wall of the head, and coacting surfaces on the cage and head for detachably locking the strainer in position.

3. The combination with a filter casing having a head provided with double-walls and an intermediate chamber, said head having an inlet opening leading directly into the casing, of a strainer carried by the head and projecting into the casing, said strainer including a cage formed of spaced bars and an exterior covering of filtering material, said outstanding flange adapted to seat upon the inner wall of the head, coacting surfaces on the cage and head for detachably locking the strainer in position, a cover-plate controlling an opening in the outer wall of the head, and means for detachably securing the plate in position.

4. The combination with a filter casing having a head provided with double-walls inclosing an intermediate chamber, said head having an opening leading into the interior of the casing forming an inlet for fluid to be filtered, and the walls of the head having alined openings, a strainer supported by the inner wall of the head and projecting into the casing, said strainer including parallel spaced bars forming a cage and said cage having an annular flange at its top adapted to seat upon the inner wall of the head, a removable cover-plate for the opening in the outer wall of the head, lugs fixed to the head, oppositely inclined cam surfaces on the top of the cage co-acting with said lugs to secure the strainer in place by a wedging action, and a filtering material surrounding the cage.

5. The combination with a filter casing having a head provided with double-walls inclosing an intermediate chamber, said head having an opening leading into the interior of the casing forming an inlet for fluid to be filtered, and the walls of the head having alined openings, a strainer supported by the inner wall of the head and projecting into the casing, said strainer including parallel spaced bars forming a cage and said strainer passing through the opening in the inner wall of the head and having an annular flange at its top adapted to seat upon the inner wall of the head, a removable cover-plate for the opening in the outer wall of the head, lugs fixed to the head, and oppositely-inclined cam surfaces on the top of the cage co-acting with said lugs to secure the strainer in place by wedging action, said flange having slots to register with said lugs, a strainer material surrounding the cage, and fastenings by which said material is secured to the cage.

6. The combination with a casing having a head formed of double-walls inclosing an intermediate chamber, said head having internal webs or reinforcing plates provided with openings, and the inner and outer walls of the head having alined openings, said head having an inlet for admitting the fluid directly into the casing, a strainer supported by the inner wall of the head, said strainer including a cage and a surrounding filtering material and said cage having a flange surrounding its upper end adapted to overhang the opening in the inner wall of the head and to seat thereon, said cage having cam surfaces on its upper portion, lugs on the interior of the head adapted to co-act with said cam surfaces to tightly seat the strainer, and a cover plate for the opening in the outer wall of the head, said plate being removably secured to afford access to the strainer.

In testimony whereof I affix my signature in presence of two witnesses.

JAMES WILLARD MORRISON.

Witnesses:
ALLEN TILLAPAUGH,
GEO. W. COLE.